United States Patent [19]

Mojden

[11] 4,315,568
[45] Feb. 16, 1982

[54] MAGNETIC RAIL FOR MAGNETIC BELT CONVEYOR

[75] Inventor: Wallace W. Mojden, Hinsdale, Ill.

[73] Assignee: Fleetwood Systems, Inc., Countryside, Ill.

[21] Appl. No.: 146,151

[22] Filed: May 2, 1980

[51] Int. Cl.³ .............................................. B65G 15/58
[52] U.S. Cl. ................................... 198/690; 335/306
[58] Field of Search ..................... 335/304, 305, 306; 198/690, 381

[56] References Cited

U.S. PATENT DOCUMENTS 3,338,374  8/1967  Dudley .
3,737,822  6/1973  Buss et al. ........................... 335/304

FOREIGN PATENT DOCUMENTS 1158466  7/1969  United Kingdom ............... 198/690

Primary Examiner—Robert B. Reeves
Assistant Examiner—Brian Bond
Attorney, Agent, or Firm—Trexler, Bushnell & Wolters, Ltd.

[57] ABSTRACT

A magnetic rail arrangement for use in a conveyor system comprises parallel runs of permanent magnets spaced laterally apart to receive bucking magnet means therebetween. This rail arrangement controls magnetic flux between the permanent magnet runs.

6 Claims, 5 Drawing Figures

MAGNETIC RAIL FOR MAGNETIC BELT CONVEYOR

FIELD OF THE INVENTION

This invention relates generally to magnetic conveyor systems and more particularly to magnetic rail constructions for use in such systems.

BACKGROUND OF THE INVENTION

During the past decade, there has been a marked increase in the transit speed of magnetic conveyor lines which are used for carrying filled tinplate or drawn steel containers, especially sanitary food containers which, while not tall, are extremely heavy. Economic utilization of factory investment has been the spur for these technical advances. However, collateral problems have arisen with each incremental increase in line speed. One particularly vexing problem has been the partial, periodic disconnection of individual cans from the magnetic circuit of the conveyor, resulting in a tilting or toppling of the can from the plane of the conveyor belt. These momentary magnetic disconnections of the cans slow the effective speed of container transit and may ultimately result in the inadvertent jamming or separation of large numbers of cans from the conveyor.

SUMMARY OF THE INVENTION

Applicant has discovered that the undesirable disconnection of the cans from a magnetic conveyor occurs because of magnetic flux leakage between the poles of the spaced permanent magnets in the system. Situating the magnets in abutting relationship, moreover, tends to make the paired magnets act as only one and does not solve the problem. Applicant has found that interposing bucking magnets interjacent the conventional, spaced, permanent magnets eliminates flux leakage between the primary magnets, focuses the flux and prevents separation of the cans from the conveyor belt.

Therefore, a general object of the present invention is to provide a new and improved magnetic conveyor system.

Another object of the invention is to provide a magnetic conveyor system which is capable of carrying filled tinplate containers at ultra-high speeds.

These and other objects and features of the invention will become apparent from a consideration of the following descriptions.

BRIEF DESCRIPTION OF THE DRAWING

In order that the principles of the invention may be readily understood, two embodiments thereof, applied to an elevating conveyor but to which the application is not to be restricted, are shown in the accompanying drawing wherein.

DETAILED DESCRIPTION OF THE INVENTION

Figure 1:
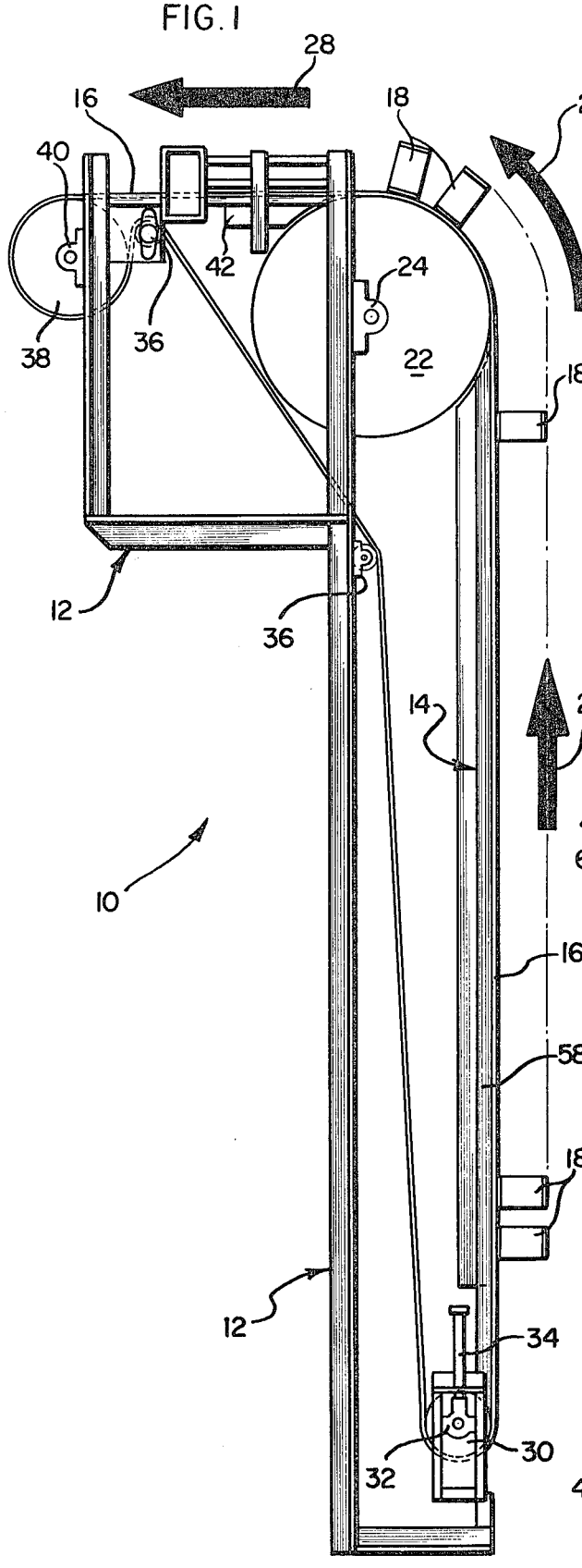
FIG. 1 is an elevational view on substantially reduced scale showing a magnetic conveyor system of the elevator type for use in raising filled tinplate containers from one height level to another.

Referring now in detail to the drawings, and giving first attention to FIG. 1, a magnetic conveyor system of the elevator type which is constructed in compliance with the present invention is shown generally by the reference numeral 10. The conveyor system 10 broadly comprises a conveyor frame arrangement 12; an ascending magnetic rail arrangement 14; an endless, flexible traveling belt 16; and a suitable roller system which will be described more fully hereinafter. Conventional indexing and feeding equipment, not shown, advances filled tinplate containers 18 individually into magnetically coupled relationship at the lower end of the magnetic rail arrangement 14; and the containers 18 move in the direction of belt travel indicated generally by the arrow 26 and into a direction of horizontal travel indicated generally by the arrow 28.

The gravitationally lower end of the belt 16 is guided over a take-up roll 30 which is mounted in vertically positionable journals 32. The journals 32 are resituatable by a piston-type arrangement 34 for adjusting tension in the belt 16. The path of belt 16 is additionally defined by a suitable number of idler rolls 36 and by an outboard roll 38 which is mounted for rotation in journals 40. If desired, an auxiliary horizontal magnetic rail system 42 can be arranged as a take-off for the containers 18 exiting the transition roll 22.

Figure 2:
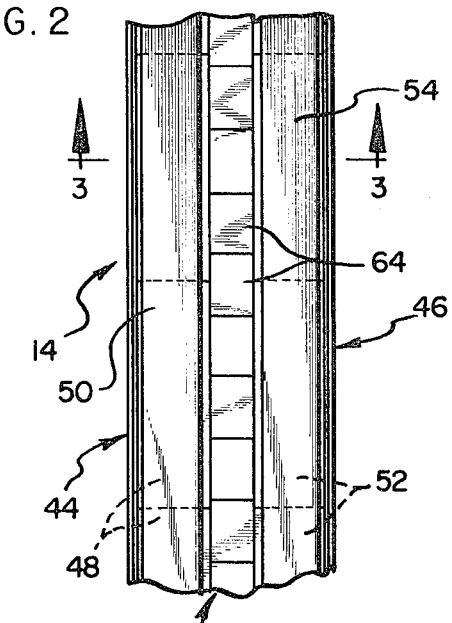
FIG. 2 is an enlarged fragmentary elevational view showing the magnetic rail arrangement used in the conveyor system of FIG. 1.
Figure 3:
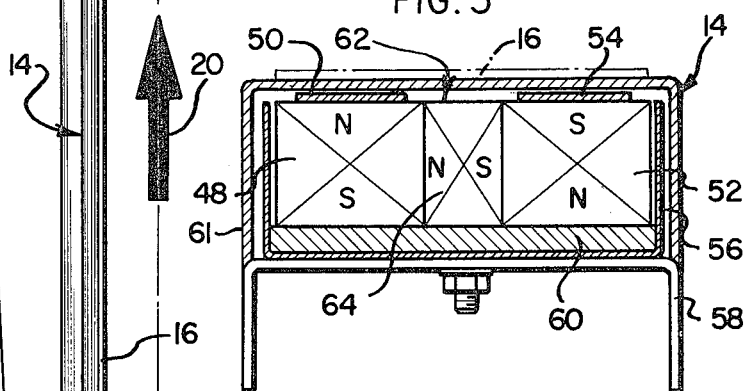
FIG. 3 is a further enlarged view taken in cross-section substantially along the line 3—3 of FIG. 2.

Turning to a consideration of FIGS. 2 and 3, magnetic rail arrangement 14 comprises a first elongate magnetic section 44 and a second, companion elongate permanent magnetic section 46, sections 44 and 46 extending longitudinally of the magnetic rail arrangement in spaced apart relationship. The permanent magnet section 44 comprises a series of individual permanent magnets 48 which present north polarity to the traveling belt 16 through an elongate pole piece 50. Similarly, the permanent magnet section 46 includes a series of individual permanent magnets 52 which display south polarity to the traveling belt 16 through a permeable pole piece 54. Conveniently, the individual permanent magnets 48 and 52 are confined in a U-shaped channel 56 which is bolted to a structural channel 58 as is best shown in FIG. 3. Moreover, a magnetic shunt or keeper 60 is disposed at the root of channel 56 magnetically coupling the permanent magnets 48 and 52. In addition, a shroud 61 of suitable non-magnetic material closes the channel 56 and defines a bed for the belt 26.

In compliance with the principles of the present invention, high strength bucking magnet means 62 are situated interjacent the magnets 48 and 52 in magnetic and abutting contact therewith and in the space ordinarily occupied by a magnetically neutral material, such as wood. As is indicated in FIG. 3, the bucking magnet means 62 displays a north polarity to the magnets 48 and a south polarity to the magnets 52. Thus arranged, the bucking magnet means of the present invention exhibits a ninety degree magnetic phase shift relative to the magnets 48 and 52, acts to control the magnetic flux between the magnets 48 and 52 and greatly enhances the magnetic holding capacity of the rail arrangement 14. Advantageously, the bucking magnet means 62 comprises a series of individual permanent magnets 64; and desirably, these magnets 64 are bonded ceramic magnets having high magnetic moment per unit volume and relatively low induction.

Figure 4:
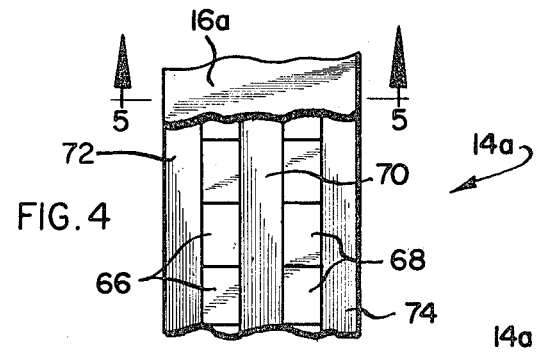
FIG. 4 is an elevational view similar to the showing of FIG. 2 but illustrating a modified form of the invention.
Figure 5:
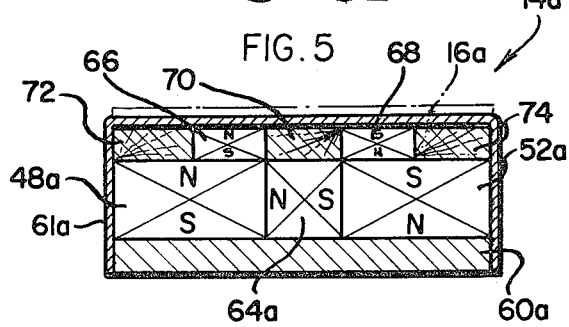
FIG. 5 is an enlarged view taken in cross-section substantially along the line 5—5 of FIG. 4.

For purposes of affording a more complete understanding of the invention, a modified embodiment thereof is shown in FIGS. 4 and 5. The embodiment of FIGS. 4 and 5 includes elements similar to those shown and described with reference to FIGS. 1–3. Accordingly, like numerals have been used to designate like parts with the suffix letter "a" being employed to distinguish those elements associated with the embodiments of FIGS. 4 and 5.

The magnetic rail arrangement 14a of FIGS. 4 and 5 is distinguished by the inclusion of parallel-disposed focusing magnets 66 and 68 which are disposed overlying the permanent magnets 48a and 52a and spaced apart by the width of the bucking magnets 64a. A spacer bar 70 of a suitable non-magnetic material, such as wood, is interposed between the magnets 66 and 68; and in addition, outboard non-magnetic blocks 72 and 74 are provided so as to define the rail arrangement 14a in generally rectangular section. Having the magnets 66 and 68, the spacer 70, and the blocks 72 and 74 of the same height is of advantage in presenting a flat surface to the belt 16a.

The magnets 66 and 68 are advantageously fabricated from an alloy of cobalt and a rare earth element so that these magnets will have an energy product of at least about twenty $B_dH_d$. When the magnets 66 and 68 are arranged and fabricated as described, they serve to further concentrate the lines of magnetic flux and prevent tilting and separation of filled cans as they rise on the elevator section of the conveyor.

The drawing and the foregoing descriptions are not intended to represent the only forms of the invention in regard to the details of its construction and manner of operation. Changes in form and in the proportion of parts, as well as the substitution of equivalents, are contemplated as circumstances may suggest or render expedient, and although specific terms have been employed, they are intended in a generic and descriptive sense only and not for the purposes of limitation, the scope of the invention being delineated in the following claims.

The invention is claimed as follows:

1. A magnetic rail arrangement for use in a conveyor system comprising: a first elongate permanent magnet means arranged to display north polarity to a traveling conveyor means; a second elongate permanent magnet means spaced laterally from said first permanent magnet means and arranged to display south polarity to the traveling conveyor means; and bucking magnet means disposed transversely of and interjacent to said first and second permanent magnet means for preventing flux leakage, and magnetic elements of comparatively larger magnetic moment per unit volume than the first and second magnet means, and are disposed between the traveling conveyor means and said first and second permanent magnet means the magnetic element engaged with said first and second magnet means being in surface-to-surface contact therewith and being of substantially smaller width with respect to the surface portions facing said conveyor means, and also oriented to present similar polarities to said conveyor means, thereby to concentrate the lines of magnetic flux.

2. A magnetic rail arrangement according to claim 1 wherein said bucking magnet means is a permanent magnet.

3. A magnetic rail arrangement according to claim 2 wherein said bucking magnet means is a ceramic permanent magnet.

4. A magnetic rail arrangement according to claim 1 wherein said bucking magnet means displays north polarity to the confronting face of said first permanent magnet and south polarity to the confronting face of said second permanent magnet.

5. A magnetic rail arrangement according to claim 1 wherein said magnetic elements have an energy product of at least about 20 $B_dH_d$.

6. A magnetic rail according to claim 1, wherein non-magnetic spacer means is disposed intermediate said magnetic elements of larger magnetic moment per unit volume.

* * * * *